United States Patent
Taniguchi et al.

(10) Patent No.: US 8,399,122 B2
(45) Date of Patent: Mar. 19, 2013

(54) SEALED BATTERY HAVING A THROUGH-HOLE OR HOLLOW IN A COLLECTOR OR COLLECTOR RECEIVING PART

(75) Inventors: Yasutomo Taniguchi, Minamiawaji (JP); Takashi Kondou, Itano-gun (JP); Yasuhiro Yamauchi, Sumoto (JP); Toshiyuki Nohma, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 401 days.

(21) Appl. No.: 12/567,902

(22) Filed: Sep. 28, 2009

(65) Prior Publication Data

US 2010/0081051 A1   Apr. 1, 2010

(30) Foreign Application Priority Data

Sep. 30, 2008   (JP) ................................ 2008-252057

(51) Int. Cl.
*H01M 6/46* (2006.01)
(52) U.S. Cl. ......... 429/162; 429/209; 429/185; 429/211
(58) Field of Classification Search .................. 429/211, 429/178, 179, 180, 185, 233, 57, 209, 162
See application file for complete search history.

(56) References Cited

FOREIGN PATENT DOCUMENTS

| JP | 2001-160387 A | 6/2001 |
|----|---------------|--------|
| JP | 2002-008708 A | 1/2002 |
| JP | 2006-310254 A | 11/2006 |
| JP | 2007-053002 A | 3/2007 |
| JP | 2007-287597   | * 11/2007 |
| JP | 2007-287597 A | 11/2007 |

\* cited by examiner

*Primary Examiner* — Raymond Alejandro
(74) *Attorney, Agent, or Firm* — Westerman, Hattori, Daniels & Adrian, LLP

(57) ABSTRACT

A sealed battery including an electrode assembly 11 having multiple positive electrode substrates exposed at one end and negative electrode substrates exposed at the other end; and collectors 18 and collector receiving parts 19 that are resistance-welded on both sides of the multiple positive or the multiple negative electrode substrates or both, a through-hole 30 being formed in at least one of the collectors 18 and the collector receiving parts 19, and the resistance welding being performed at the rim of the through-hole 30. With such sealed battery, the spattered particles 26 generated during the resistance welding are captured in the through-hole 30, and will rarely enter the interior of the electrode assembly 11 or splash out to the exterior.

7 Claims, 6 Drawing Sheets

SEALED BATTERY HAVING A THROUGH-HOLE OR HOLLOW IN A COLLECTOR OR COLLECTOR RECEIVING PART

TECHNICAL FIELD

The present invention relates to a sealed battery. More particularly it relates to a sealed battery which has exposed portions of positive electrode substrates at one end of a sealed-battery application electrode assembly and of negative electrode substrates at the other end, and which has high-reliability with low occurrence of internal short-circuits, since the movement of spattered particles into the interior of the electrode assembly when collectors are resistance-welded to the substrates is prevented.

BACKGROUND ART

Curbs on emissions of carbon dioxide and other substances have been strengthened against a background of a growing environmental protection movement, and in the automobile world there is now vigorous development of electric vehicles (EVs) and hybrid electric vehicles (HEVs) alongside vehicles using fossil fuels such as gasoline, diesel oil and natural gas. In addition, the soaring price of fossil fuels in recent years has acted to spur on the development of EVs, HEVs and the like.

The batteries used for such EVs, HEVs and the like are generally nickel-hydrogen secondary batteries or lithium ion secondary batteries. However, what is now required of EVs and HEVs is not only environmental friendliness, but also basic performance as an automobile, in other words, superior driving performance. Therefore, it is necessary not simply to enlarge the capacity, but also to increase the output, of the batteries used for EVs and HEVs, in order to effect large improvements in these vehicles' acceleration and hill-climbing performance. However, when a high output is discharged, a large current flows in the battery, and as a result there is a large increase in heat due to contact resistance between the substrates and the collectors, which are the generation elements. Thus, batteries for EVs and HEVs are required not only to be large-sized and large capacity, but also to handle a large current. Accordingly, with the object of preventing electricity loss inside the battery and thereby reducing heat emission, many improvements have been carried out with regard to lowering the internal resistance by preventing welding faults between the substrates and collectors, which are the generation elements.

There exist the methods of mechanical caulking, welding and the like for electrically joining the substrates and collectors, which are the generation elements. Welding is appropriate as the electrical collection method for batteries of which high output is required. Also, in a lithium ion secondary battery, in order to effect low resistance, the material used for the positive electrode substrates and collector is aluminum or aluminum alloy, and the material used for the negative electrode substrates and collector is copper or copper alloy. However, these materials have the characteristics of low electrical resistance and high thermal conductivity, so that an extremely large amount of energy is required in order to weld them.

The following methods have long been known as methods for welding together the substrates and collectors which are the generation elements:
1) Laser welding (see JP-A-2001-160387)
2) Ultrasonic welding (see JP-A-2007-053002)
3) Resistance welding (see JP-A-2006-310254)

With the laser welding method, a high-energy laser beam is required because the reflectivity of the aluminum, aluminum alloy, copper, or copper alloy welded material with respect to the YAG (yttrium-aluminum garnet) laser light that is widely used to weld metals is high—around 90%. There also exist the problems that when aluminum, aluminum alloy, copper, or copper alloy is laser-welded, the weldability varies greatly depending on the condition of the surfaces, and that the occurrence of spattering is unavoidable, as in laser welding of other materials.

Ultrasonic welding also requires a large amount of energy, because the thermal conductivity of the aluminum, aluminum alloy, copper, or copper alloy welded material is high. Also, the positive electrode active material and/or negative electrode active material may be dislodged by the ultrasonic vibration during welding. Accordingly, in the invention disclosed in JP-A-2007-053002, the electrode assembly, which is the generation element, is compressed during ultrasonic welding, so that dislodged negative electrode active material will not enter inside it.

Further, with resistance welding, due to the aluminum, aluminum alloy, copper, or copper alloy welded material having low electrical resistance and high thermal conductivity there exist the problems that large current needs to be input in a short time, that fusion-joining of the collectors and the electrode rods which are used in resistance welding sometimes occurs during welding, and that melting or spark generation may occur at places other than the welds.

Thus, the three welding methods have their merits and drawbacks. In the interests of productivity and economy however, the resistance welding method, which has long been used as a method for welding between metals, will preferably be employed. With the electrode assembly (see JP-A-2002-008708) of EV and HEV application sealed batteries however, since the exposed portions of the positive electrode substrates and negative electrode substrates have a large number of stacked layers, a great deal of welding energy is necessary in order to firmly resistance-weld the collector made of aluminum or aluminum alloy to the positive electrode substrates, and the collector made of copper or copper alloy to the negative electrode substrates. Moreover, when the welding energy is rendered large for resistance welding, the generation of spattered particles is increased and there is increased probability that the particles will move into the inside of the electrode assembly, so that an internal short circuit is caused.

JP-A-2007-287597 discloses the invention of a storage battery in which the electrode substrates are resistance-welded to the peripheral wall of a hole (burring hole) provided in the collectors. However, with the invention disclosed in JP-A-2007-287597, the collectors are welded to the substrates while being pressed, in a perpendicular direction, against the forward edge portions of the substrates, so that the collectors are not in surface contact with the substrates, and consequently it is not possible to, control the dispersion direction of the spattered particles. Also, with the invention disclosed in JP-A-2007-287597, the number of substrates that contact with the rim portion of the hole provided in the collectors is small (one substrate), and therefore the quantity of molten metal (nuggets) occurring during the resistance welding is small, so that the spattered particles cannot be captured.

SUMMARY

An advantage of some aspects of the present invention is to provide a sealed battery which has exposed portions of positive electrode substrates at one end of a sealed-battery application electrode assembly and of negative electrode substrates at the other end, and which is highly reliable with low occurrence of internal short-circuits, since the movement of spattered particles into the interior of the electrode assembly when collectors and collector receiving parts are resistance-welded to the substrates is prevented.

According to an aspect of the invention, a sealed battery includes an electrode assembly having multiple positive electrode substrates exposed at one end and multiple negative electrode substrates exposed at the other end, and collectors and collector receiving parts that are resistance-welded on both sides of at least one of the multiple positive electrode substrates and the multiple negative electrode substrates, a through-hole or hollow being formed in at least one of the collectors and collector receiving parts, and the resistance-welding being performed at the rim of the through-hole or hollow.

The sealed battery according to the present aspect needs to have a sealed-battery application electrode assembly having multiple positive electrode substrates exposed at one end and negative electrode substrates exposed at the other end, and collectors and collector receiving parts that are resistance-welded on both sides of at least one of the multiple positive electrode substrates and the multiple negative electrode substrates. Typically, with such a sealed battery, a large amount of welding energy has to be applied in order to effect firm welding, since the electrode assembly has a large number of stacked layers—usually around 10 to 300 layers. This increases the generation of spattered particles during resistance welding.

Also, to resistance-weld the collectors and collector receiving parts to both sides of the multiple substrates, the collectors and collector receiving parts are disposed on both sides of the multiple substrates and are welded with resistance-welding electrode rods while being pressured from both sides. In the sealed battery of the present aspect, a through-hole or hollow is formed in at least one of the collectors and collector receiving parts, and the resistance-welding is performed at the rim of the through-hole or hollow. This means that at the rim of the through-hole or hollow, the collector and substrates are in surface contact, so that the dispersion direction of the spattered particles generated during resistance welding is restricted by the through-hole or hollow, and also the molten metal (melted substrate) occurring during resistance welding flows into the through-hole or hollow. Hence, according to the present aspect, a high-reliability sealed battery is obtained which has low occurrence of internal short-circuits, since spattered particles and molten metal generated during resistance welding rarely splash out to the exterior of the collectors and collector receiving parts or disperse into the interior of the electrode assembly. Note that with the present aspect, the number of stacked layers in the electrode assembly will preferably be 30 or more, in order to make the molten metal flow into the through-hole or hollow and in order to be able to capture the spattered particles adequately.

The substrates, collectors, and collector receiving parts in the sealed battery with the above-described arrangement may all be formed of the same metal or differing metals, and this applies equally well both to the positive electrode substrates and to the negative electrode substrates. Further, provided that the sealed battery of this arrangement is equipped with a sealed battery application electrode assembly having positive electrode substrates exposed at one end and negative electrode substrates exposed at the other end, and with collectors and collector receiving parts that are disposed opposing each other and resistance-welded on both sides of at least one of the positive and the negative electrode substrates, the electrode assembly may be of the wound type or the stacked type, and moreover the battery may be a nonaqueous or aqueous electrolyte secondary battery.

With the sealed battery of the above-described arrangement, it is preferred that the through-hole or hollow be of a circular shape, an elliptical shape, or a polygonal shape, viewed from above.

With the through-hole or hollow having a circular shape, an elliptical shape, or a polygonal shape, viewed from above, in such a sealed battery of the invention, it is a simple matter to form the through-hole or hollow in the collectors and collector receiving parts.

With the sealed battery of the above-described arrangement, it is preferred that the largest diameter of the through-hole or hollow be 2 mm to 3 mm. Note that with regard to the invention, the "largest diameter" of the through-hole or hollow refers to the longest among the various diameters thereof viewed from above.

Typical particles spattered during the resistance welding have a diameter of around a few micrometers to a few millimeters. Accordingly, when the through-hole or hollow has a largest diameter of 2 mm or more, the effectiveness of capture of the particles spattered during the resistance welding is improved, and when the through-hole or hollow has a largest diameter of no more than 3 mm, the collectors and collector receiving parts can be downsized.

With the sealed battery of the above-described arrangement, it is preferred that the thickness of the collectors and collector receiving parts be 0.2 mm to 2 mm.

During the resistance welding, the substrates melt, forming molten portions (nuggets), at the positions corresponding to the through-hole or hollow. When the collectors and collector receiving parts have thickness of 0.2 mm or more, the height of the through-hole or hollow formed in the collectors and collector receiving parts can be rendered 0.2 mm or more, and furthermore, the large-diameter spattered particles will be captured in the molten portions, so that the effectiveness of capture of the spattered particles is improved, and when the collectors and collector receiving parts have thickness of no more than 2 mm, the collectors and collector receiving parts can be rendered thin while securing effectiveness of capture of the particles spattered during the resistance welding.

With the sealed battery of the above-described arrangement, it is preferred that the resistance-welded substrates, collectors, and collector receiving parts be made of aluminum or an aluminum alloy, or of copper or a copper alloy.

Aluminum and aluminum alloys, and copper and copper alloys, are all materials with good electrical conductivity and good thermal conductivity, and therefore generate a large amount of spattered particles during resistance welding, which requires a large current to be passed. However, with the sealed battery of the above-described arrangement, a large amount of the spattered particles generated will be captured in the through-hole or hollow in the resistance-welded portion, whereby the foregoing advantages of the above-described arrangement will be satisfactorily exhibited.

With the sealed battery of the above-described arrangement, it is also preferred that the electrode rods used for the resistance welding be of a diameter larger than the largest diameter of the through-hole or hollow viewed from above, and that the resistance welding be performed with the resistance-welding electrode rods being brought into contact in such a manner that center thereof coincides with the center of the through-holes or hollows viewed from above.

According to the above-described arrangement for a sealed battery of the invention, during the resistance welding the collector or collector receiving part is covered by a resistance-welding electrode rod at the position corresponding to the through-hole or hollow. Consequently, during the resistance welding the molten metal that flows into the through-hole or hollow will not splash out to the exterior, and neither will the spattered particles splash out to the exterior. Further, even if the top plate overlying the hollow should melt during the resistance welding, the same effects and advantages will be produced. Thus, with the invention, a sealed battery which is highly reliable with low occurrence of internal short-circuits can be obtained. Note that after the resistance welding it is possible to determine the positions on the surfaces of the collectors and collector receiving parts where the resistance-welding electrode rods contacted, since traces are left there by the current that flows, and the heat that is generated, during the resistance welding.

BRIEF DESCRIPTION OF THE DRAWINGS

The invention will be described with reference to the accompanying drawings, in which the same numerals refer to the same elements throughout.

DESCRIPTION OF EXEMPLARY EMBODIMENTS

Exemplary embodiments of the invention will now be described with reference to the accompanying drawings and to working examples and a comparative example. It should be understood however that the embodiments below are intended by way of illustrative examples of methods for manufacturing a prismatic nonaqueous electrolyte secondary battery, as an instance of a sealed battery, that carry out the technical concepts of the invention, and are not intended by way of limiting the invention to these particular manufacturing methods for a prismatic nonaqueous electrolyte secondary battery. The invention could equally well be applied to yield other embodiments—say, a sealed battery or the like using an aqueous electrolyte, such as a nickel-hydrogen secondary battery or a nickel-cadmium secondary battery—within the scope and spirit of the claims.

Figure 1:
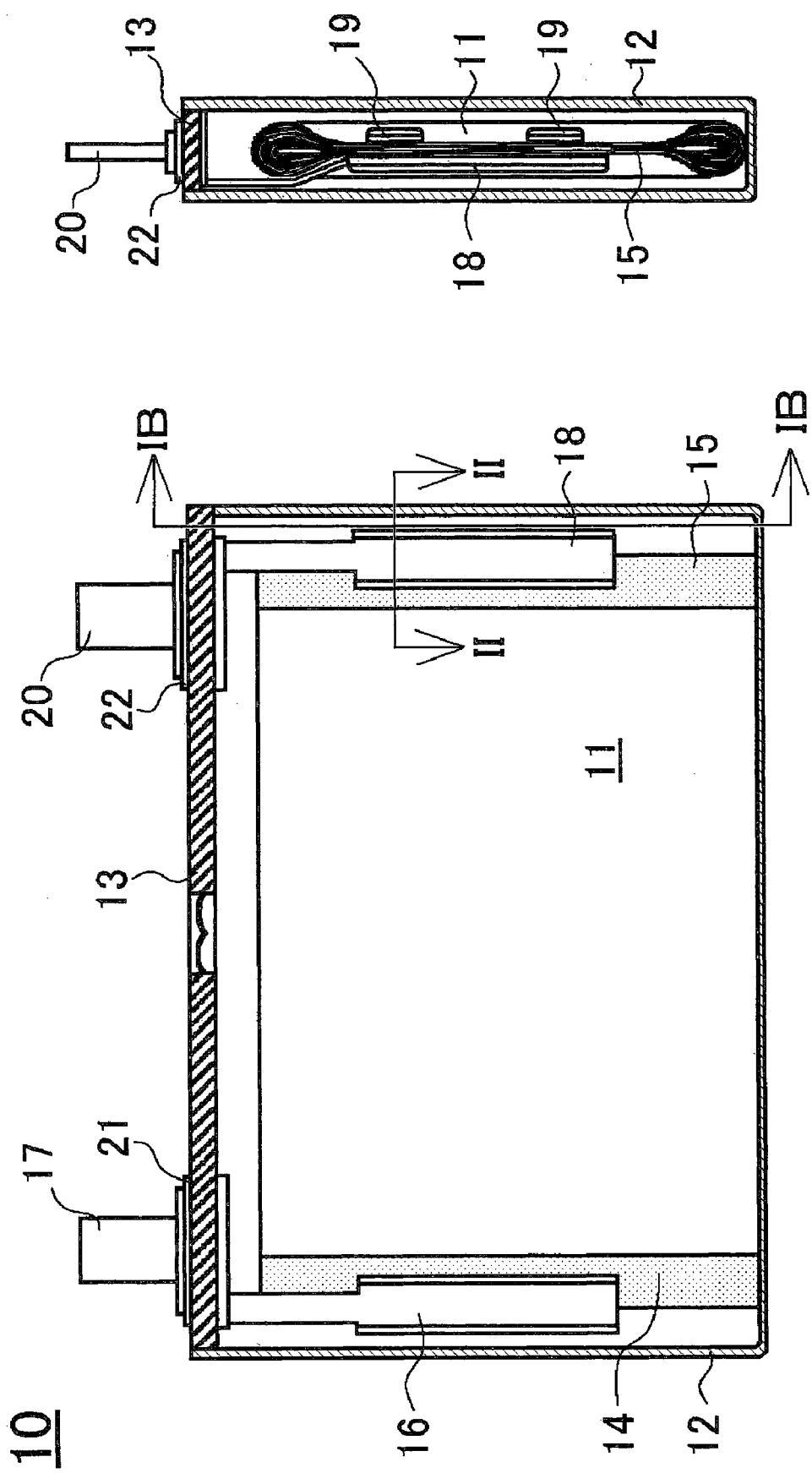
FIG. 1A is a front view illustrating the internal structure of a prismatic battery that is common to both the working examples and the comparative example.
FIG. 1B is a cross sectional view along line IB-IB in FIG. 1A.
Figure 2:
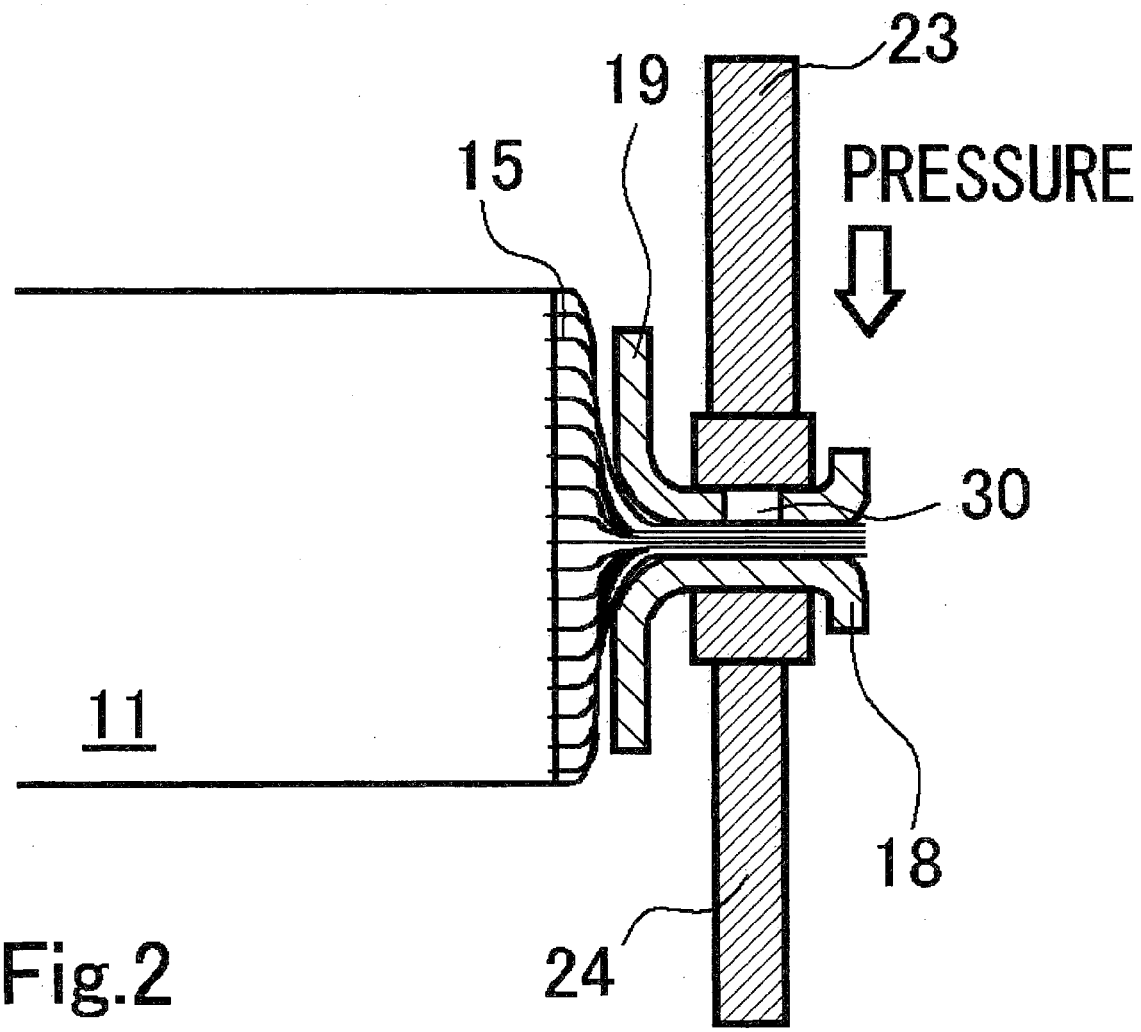
FIG. 2 is a cross sectional view along line II-II in FIG. 1A, which describes a resistance-welding method.
Figure 3:
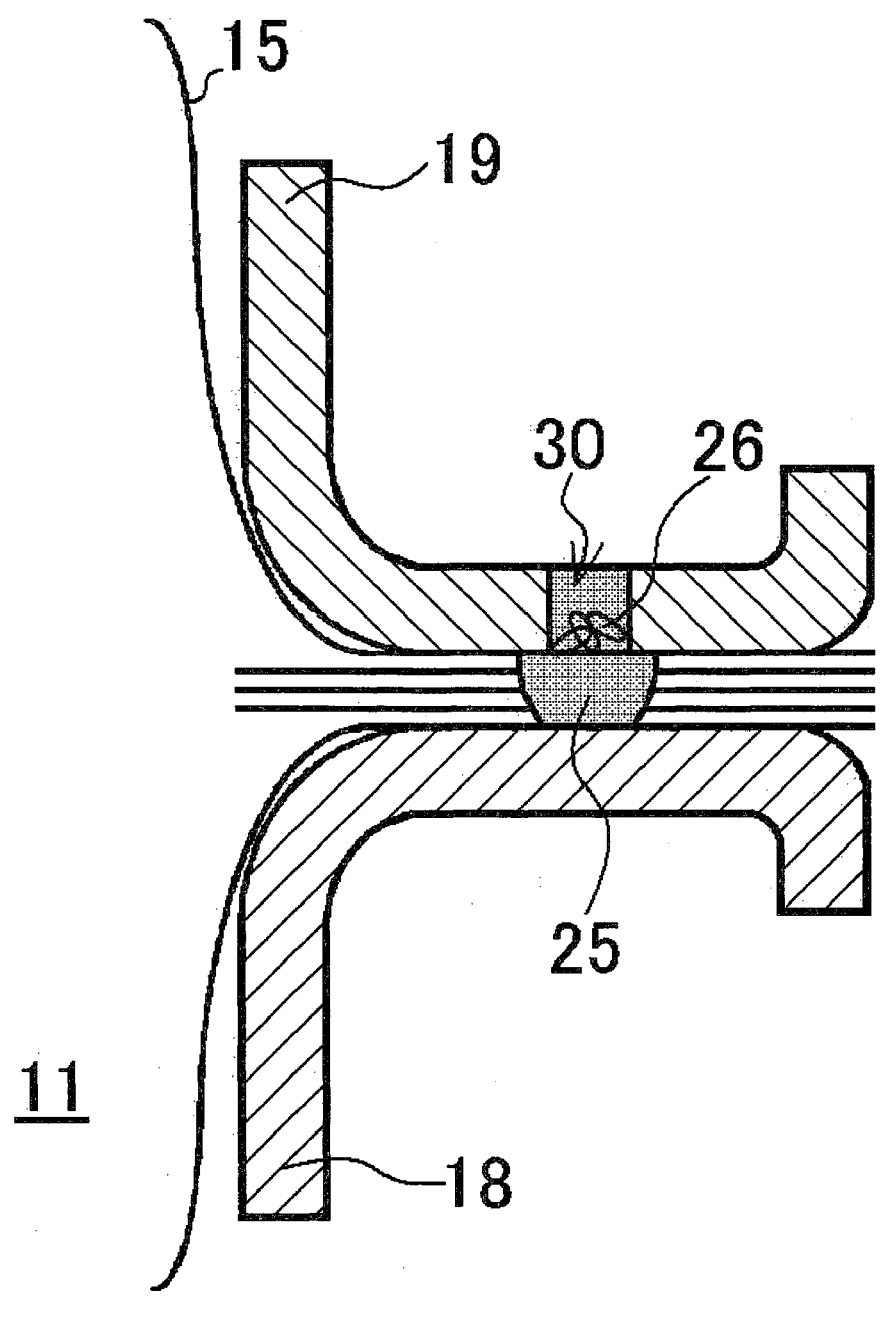
FIG. 3 is an enlarged cross-sectional view, corresponding to FIG. 2, of the prismatic battery in the first working example.
Figure 4:
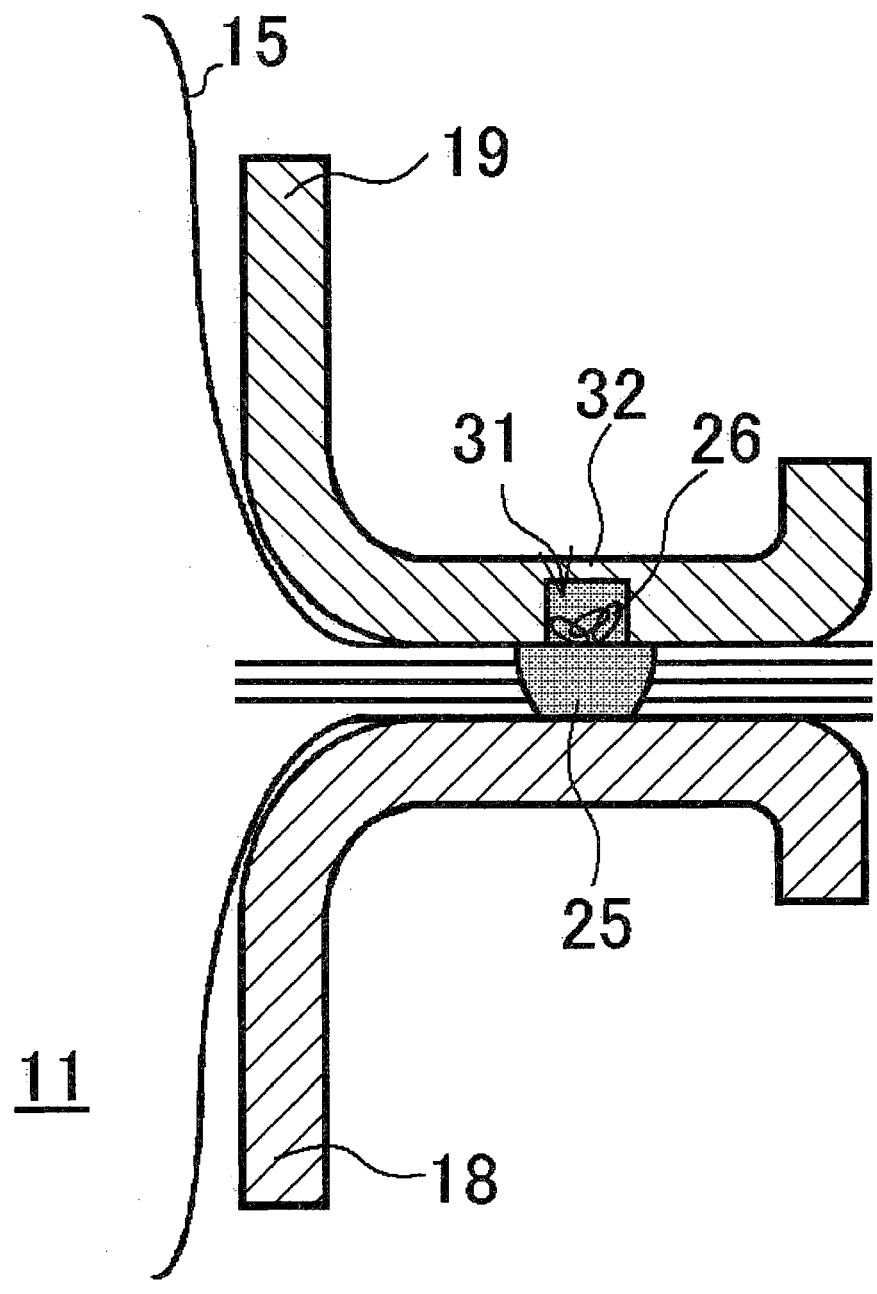
FIG. 4 is an enlarged cross-sectional view, corresponding to FIG. 2, of the prismatic battery in the second working example.
Figure 5:
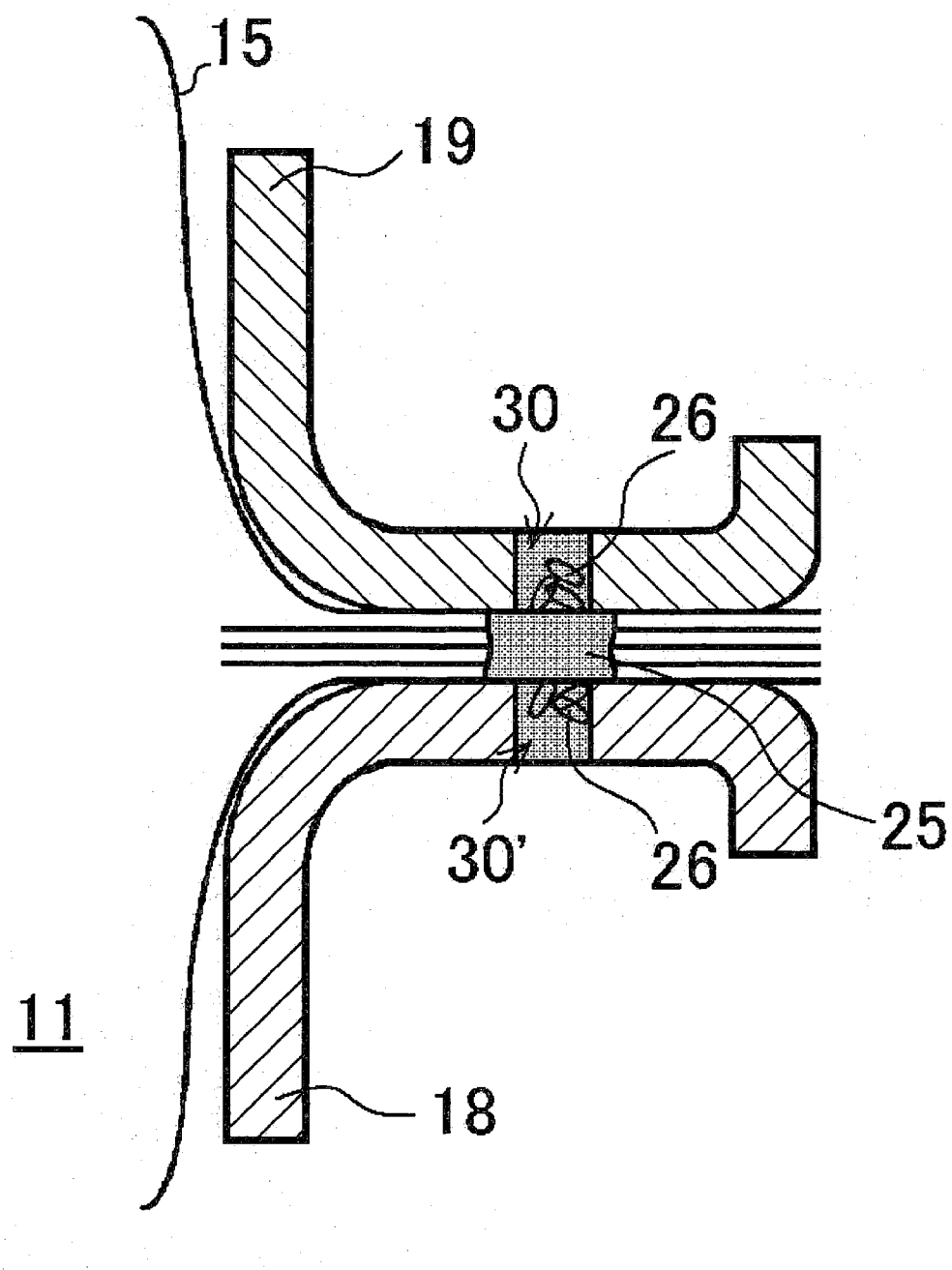
FIG. 5 is an enlarged cross-sectional view, corresponding to FIG. 2, of the prismatic battery in the third working example.
Figure 6:
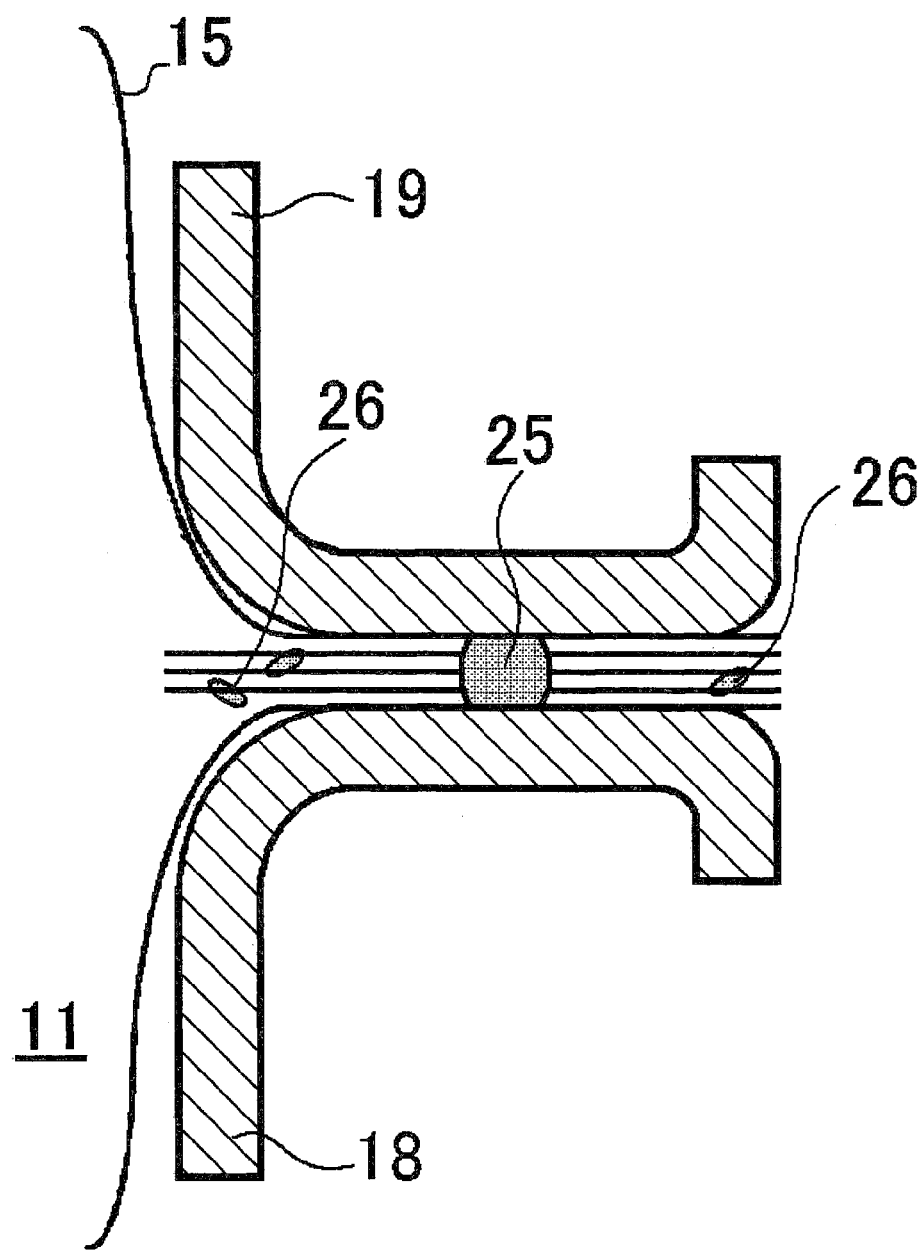
FIG. 6 is an enlarged cross-sectional view, corresponding to FIG. 2, of the prismatic battery in the comparative example.

FIG. 1A is a front view illustrating the internal structure of a prismatic battery that is common to both the working examples and the comparative example, and FIG. 1B is a cross sectional view along line IB-IB in FIG. 1A. FIG. 2 is a cross sectional view along line II-II in FIG. 1A, which describes a resistance-welding method. FIG. 3 is an enlarged cross-sectional view, corresponding to FIG. 2, of the prismatic battery in the first working example. FIG. 4 is an enlarged cross-sectional view, corresponding to FIG. 2, of the prismatic battery in the second working example. FIG. 5 is an enlarged cross-sectional view, corresponding to FIG. 2, of the prismatic battery in the third working example. FIG. 6 is an enlarged cross-sectional view, corresponding to FIG. 2, of the prismatic battery in the comparative example.

First of all a prismatic nonaqueous electrolyte secondary battery that is an instance of a sealed battery and is common to both the working examples and the comparative example will be described using FIGS. 1A and 1B. In this nonaqueous electrolyte secondary battery 10, a flat wound electrode assembly 11, which is made up of positive electrode plates (not shown in the drawings) and negative electrode plates (not shown in the drawings) wound with separators (not shown in the drawings) interposed, is housed inside a rectangular outer can 12, and the outer can 12 is sealed by a sealing plate 13.

The flat wound electrode assembly 11 has, at one end in the winding axis direction, positive electrode substrate exposed portions 14 over which positive electrode binder is not spread, and at the other end, negative electrode substrate exposed portions 15 over which negative electrode binder is not spread. The positive electrode substrate exposed portions 14 are connected to a positive electrode terminal 17 via a positive electrode collector 16 and the negative electrode substrate exposed portions 15 are connected to a negative electrode terminal 20 via a negative electrode collector 18. The positive electrode terminal 17 and the negative electrode terminal 20 are fixed to the sealing plate 13 via insulating members 21 and 22 respectively.

To fabricate this prismatic nonaqueous electrolyte secondary battery 10, the flat wound electrode assembly 11 is inserted into the outer can 12, then the sealing plate 13 is laser-welded over the mouth portion of the outer can 12, after which the nonaqueous electrolyte is poured in through an electrolyte pour hole (not shown in the drawings) and the electrolyte pour hole is sealed up. An example of an electrolyte which can be used is a solution of ethylene carbonate and diethyl carbonate mixed in the proportion 3:7 by volume, into which 1 mole/L of $LiPF_6$ is dissolved to produce a nonaqueous electrolyte.

Next is described the specific manufacturing method for the flat wound electrode assembly 11, which is common to both the working examples and the comparative example.

Fabrication of Positive Electrode Plates

The positive electrode plates are fabricated as follows. First of all, lithium cobalt oxide ($LiCoO_2$) powder serving as the positive electrode active material, carbon-based powder such as acetylene black or graphite serving as the conducting material, and binding agent constituted of polyvinylidene-fluoride (PVdF) are mixed in the proportions 94%, 3% and 3% by mass. Then an organic solvent constituted of N-methyl-2-pyrrolidone (NMP) is added to the resulting mixture and stirred in to form positive electrode active material mixture slurry. Next, a positive electrode substrate constituted of aluminum foil (say 20 μm thick) is prepared, and the positive electrode active material mixture slurry made in the foregoing manner is applied evenly over both surfaces of the positive electrode substrate to form positive electrode active material mixture layers. The positive electrode active material is applied in such a manner that in the positive electrode active material mixture layer on one surface, a bare portion (positive electrode substrate exposed portion) of a particular width (12 mm in this example) where the slurry is not applied is formed along the edge of the positive electrode substrate. After that, the positive electrode substrate with the positive electrode active material mixture layers formed thereon is passed through a drier, where the NMP that was needed during fabrication of the slurry is removed and the substrate is dried. After such drying, the substrate is rolled in a roll press into a positive electrode plate of thickness 0.06 mm. The positive electrode plate thus fabricated is then cut into a strip 100 mm wide, so that a positive electrode plate is obtained that is provided with a 10 mm wide strip-form exposed portion of aluminum positive electrode substrate.

Fabrication of Negative Electrode Plates

The negative electrode plates are fabricated as follows. First of all, natural graphite powder serving as the negative electrode active material, and carboxymethyl cellulose (CMC) and styrene-butadiene rubber (SBR) serving as binding agents, are mixed in the proportions 98%, 1% and 1% by mass. Then water is added and the mixture is stirred to produce negative electrode active material mixture slurry. Next, a negative electrode substrate constituted of copper foil (say 12 µm thick) is prepared, and the negative electrode active material mixture slurry made in the foregoing manner is applied evenly over both surfaces of the negative electrode substrate to form negative electrode active material mixture layers. The negative electrode active material is applied in such a manner that in the negative electrode active material mixture layer on one surface, a bare portion (negative electrode substrate exposed portion) of a particular width (10 mm in this example) where the slurry is not applied is formed along the edge of the negative electrode substrate. After that, the negative electrode substrate with the negative electrode active material mixture layers formed thereon is passed through a drier and dried. After such drying, the substrate is rolled in a roll press into a negative electrode plate of thickness 0.05 mm. The negative electrode plate thus fabricated is then cut into a strip 110 mm wide, so that a negative electrode plate is obtained that is provided with an 8 mm wide strip-form exposed portion of negative electrode substrate.

Fabrication of Wound Electrode Assembly

First, the positive electrode substrate exposed portions of the positive electrode plates, and negative electrode substrate exposed portions of the negative electrode plates, that were obtained in the foregoing manner, are displaced so as not to overlie the electrode active material mixture layers that are respectively opposed to them, and then the electrode plates are wound, with porous polyethylene separators (0.022 mm thick and 100 mm wide) interposed between them, to produce a flat wound electrode assembly 11 which has multiple positive electrode substrate exposed portions 14 constituted of aluminum foil formed at one end and negative electrode substrate exposed portions 15 constituted of copper foil at the other, and which is used in the working examples and the comparative example.

Resistance Welding of Collectors

A positive electrode collector 16 and a positive electrode collector receiving part (not shown in the drawings) made of aluminum are attached by resistance welding to the positive electrode substrate exposed portions 14 of the flat wound electrode assembly 11 fabricated in the foregoing manner, and likewise, a negative electrode collector 18 and a negative electrode collector receiving part 19 made of copper are attached by resistance welding to the negative electrode substrate exposed portions 15. The attachment of the negative electrode collector 18 and negative electrode collector receiving part 19 made of copper to the negative electrode substrate exposed portions 15 by resistance welding will now be described.

To attach the negative electrode collector 18 and negative electrode collector receiving part 19 made of copper to the negative electrode substrate exposed portions 15 by resistance welding, the negative electrode collector 18 is placed on a resistance-welding electrode rod 24 which is fixed at the bottom, and then the negative electrode collector receiving part 19 is placed thereon with the negative electrode substrate exposed portion 15 interposed, as shown in FIG. 2. Next, an upper resistance-welding electrode rod 23 is placed on the negative electrode collector receiving part 19, and the resistance-welding is performed by pushing the electrode rod 23 against the negative electrode collector receiving part 19 with a particular pressuring force determined experimentally beforehand, and passing a particular resistance-welding current. Note that FIG. 2 shows an example corresponding to the first working example, in which a through-hole 30 is provided in the negative electrode collector receiving part 19.

After the negative electrode collector 18 and negative electrode collector receiving part 19 made of copper have been attached to the negative electrode substrate exposed portions 15 by resistance welding in the foregoing manner, the positive electrode collector and positive electrode collector receiving part are attached to the positive electrode collector exposed portions in a separate process, to complete assembly of a prismatic nonaqueous electrolyte secondary battery serving as an instance of a sealed battery.

Next, the advantages of each of the first to third working examples and the comparative example were determined. Specifically, the advantages were determined in the case where the through-hole (first working example) or hollow (second working example) of the invention is formed in the negative electrode collector 18 or the negative electrode collector receiving part 19, the case where the through-hole is formed in both the negative electrode collector 18 and the negative electrode collector receiving part 19 (third working example), and the case where neither the through-hole nor the hollow is formed in either the negative electrode collector 18 or the negative electrode collector receiving part 19 (the comparative example).

First Working Example

In the first working example, as shown in FIG. 2, a 2 mm thick negative electrode collector receiving part 19 made of copper and having a through-hole 30 with circular cross-sectional shape and diameter of 3 mm formed in the central part thereof, was used, and a 2 mm thick negative electrode collector 18 made of copper was used. Resistance welding was carried out with the upper resistance-welding electrode rod 23 placed so that the centerline thereof coincided with the center of the through-hole 30, and with the mouth portion of the through-hole 30 completely blocked by the upper resistance-welding electrode rod 23. During such resistance welding, splashing out of the spattered particles to the exterior, and the extent to which the spattered particles were captured inside the through-hole 30, were examined visually. Further, after the resistance-welding, the negative electrode collector 18 and the negative electrode collector receiving part 19 were forcibly peeled off from the negative electrode substrate exposed portion 15, and it was examined visually whether the spattered particles had splashed across onto the wound electrode assembly 11. The results of such examinations are summarized in Table 1. Note that FIG. 3 shows schematically the form of a molten portion 25 formed at the resistance-welded portion, and spattered particles 26 in a captured state, after the resistance-welding.

Second Working Example

In the second working example, a negative electrode collector 18 the same as that in the first working example was used, and a 2 mm thick negative electrode collector receiving part 19 made of copper and having a 1.5 mm deep hollow 31 with circular cross-sectional shape and diameter of 3 mm formed in the central part thereof, was used. Thus, the thickness of the top plate 32 portion overlying the hollow 31 of the negative electrode collector receiving part 19 was 0.5 mm. Resistance welding was carried out with the upper resistance-welding electrode rod 23 placed over the top plate 32 overlying the hollow 31, in such a manner that the centerline of the upper resistance-welding electrode rod 23 coincided with the center of the hollow 31 and the mouth portion of the through-hole 31 was completely blocked by the upper resistance-welding electrode rod 23 viewed from above. During such resistance welding, splashing out of the spattered particles to the exterior, and the extent to which the spattered particles were captured inside the hollow 31, were examined visually. Further, after the resistance-welding, the negative electrode collector 18 and the negative electrode collector receiving part 19 were forcibly peeled off from the negative electrode substrate exposed portion 15, and it was examined visually whether the spattered particles had splashed across onto the wound electrode assembly 11. The results of such examinations are summarized in Table 1. Note that FIG. 4 shows schematically the form of a molten portion 25 formed at the resistance-welded portion, and spattered particles 26 in a captured state, after the resistance-welding.

Third Working Example

In the third working example, as shown in FIG. 5, a 2 mm thick negative electrode collector receiving part 19 made of copper and having a through-hole 30 with circular cross-sectional shape and diameter of 3 mm formed in the central part thereof, was used, and a 2 mm thick negative electrode collector 18 made of copper and having a through-hole 30' with circular cross-sectional shape and diameter of 3 mm formed in the central part thereof, was used. Resistance welding was carried out with the upper resistance-welding electrode rod 23 disposed above, and the lower resistance-welding electrode rod 24 disposed below, the negative substrate exposed portions 15, in such a manner that the centerline of the upper resistance-welding electrode rod 23 coincided with the center of the through-hole 30, the centerline of the lower resistance-welding electrode rod 24 coincided with the center of the through-hole 30', and the mouth portions of the through-holes 30 and 30' were completely blocked by the upper resistance-welding electrode rod 23 and lower resistance-welding electrode rod 24, respectively. During such resistance welding, splashing out of the spattered particles to the exterior, and the extent to which the spattered particles were captured inside the through-holes 30 and 30', were examined visually. Further, after the resistance-welding, the negative electrode collector 18 and the negative electrode collector receiving part 19 were forcibly peeled off from the negative electrode substrate exposed portion 15, and it was examined visually whether the spattered particles had splashed across onto the wound electrode assembly 11. The results of such examinations are summarized in Table 1. Note that FIG. 5 shows schematically the form of a molten portion 25 formed at the resistance-welded portion, and spattered particles 26 in a captured state, after the resistance-welding.

Comparative Example

In the comparative example, resistance welding was carried out using a negative electrode collector 18 the same as that in the first working example, and using a negative electrode collector receiving part 19 of the same form as that in the first working example except that no through-hole 30 was formed therein. As described above for the working examples, splashing out of the spattered particles to the exterior during such resistance welding was examined visually, and further, after the resistance-welding, the negative electrode collector 18 and the negative electrode collector receiving part 19 were forcibly peeled off from the negative electrode substrate exposed portion 15, and it was examined visually whether the spattered particles had splashed across onto the electrode assembly 11. The results of such examinations are summarized in Table 1. Note that FIG. 6 illustrates the state of the resistance-welded portion after the resistance welding, showing schematically the form of a molten portion 25 formed at the resistance-welded portion, and the presence of spattered particles 26, after the resistance-welding.

TABLE 1

|  | Generation of spattered particles | Capture of particles in through-hole, hollow | Splashing of particles to the exterior and into the interior of electrode assembly |
|---|---|---|---|
| First Embodiment | present | present | none |
| Second Embodiment | present | present | none |
| Third Embodiment | present | present | none |
| Comparative Example | present | — | present |

*All sizes are in a unit of mm.

From the results set forth in Table 1, it can be seen that when the through-hole 30, 30' or hollow 31 is formed in the negative electrode collector 18 and negative electrode collector receiving part 19 at the resistance weld portion, the particles generated by the spattering are captured in the through-hole 30, 30' or the hollow 31 and rarely disperse into the interior or to the outside of the wound electrode assembly 11, so that there can be obtained, as an instance of a sealed battery, a nonaqueous electrolyte secondary battery 10 which is highly reliable with low occurrence of internal short-circuits.

Additionally, although both the negative electrode substrate exposed portions and collector were made of copper in the first to third working examples described above, the same advantages can be obtained in the case where they are made of copper alloy, and furthermore in the case where the positive electrode substrate exposed portions and collector are constituted of aluminum or aluminum alloy. Also, copper is the metal with the highest thermal conductivity among the metals commonly used for substrates of electrodes, so that when the invention is applied to cases where the collector etc. are made of another metal than copper, the spattered metal particles will splash to the exterior even more rarely. Therefore, it will be appreciated that according to the invention, irrespective of the type of the sealed battery, a sealed battery which is highly reliable with low occurrence of internal short-circuits can be obtained.

Further, although the third working example illustrates a case where the negative electrode collector 18 and negative electrode collector receiving part 19 used each have the through-hole 30 of circular cross-sectional shape formed in the center thereof, it will alternatively be possible for both these items to have a hollow formed therein, or for one to have a through-hole, and the other to have a hollow, formed therein. Also, although the foregoing working examples describe cases where an electrode assembly for a prismatic nonaqueous electrolyte secondary battery is used, there is no particular restriction on the shape of the electrode assembly, and the invention is also applicable to the case where a cylindrical wound electrode assembly is used. In addition, although the foregoing embodiments describe cases where a flat-shaped wound electrode assembly is used, it is obvious that the invention is, applicable also to, say, electrode assemblies constituted of flat-plate shaped positive and negative electrode plates stacked with separators interposed, or to the like items.

What is claimed is:

1. A sealed battery comprising:
a flat electrode assembly having multiple positive electrode substrates exposed at one end and multiple negative electrode substrates exposed at the other end; and
a collector and at least one collector receiving part that are resistance-welded on both sides of at least one of the multiple positive electrode substrates and the multiple negative electrode substrates,
a through-hole or hollow being formed in the collector and/or at least one of the collector receiving parts, and the resistance welding being performed at a rim of the through-hole or hollow, wherein
the collector is placed to one outermost surface parallel with the multiple positive electrode substrates or the multiple negative electrode substrates of the positive electrode substrate exposed portions or the negative electrode substrate exposed portions, and the collector receiving parts are placed to an opposite outermost surface parallel with the multiple positive electrode substrates or the multiple negative electrode substrates of the positive electrode substrate exposed portions or the negative electrode substrate exposed portions.

2. The sealed battery according to claim 1, wherein the substrates melted by the resistance-welding are solidified inside the through-hole or hollow.

3. The sealed battery according to claim 2, wherein the shape of the through-hole or hollow viewed from above is circular, elliptical or polygonal.

4. The sealed battery according to claim 2, wherein the largest diameter of the through-hole or hollow is 2 mm to 3 mm.

5. The sealed battery according to claim 2, wherein the thickness of the collectors and the collector receiving parts is 0.2 mm to 2 mm.

6. The sealed battery according to claim 2, wherein the resistance-welded substrates, collector, and collector receiving parts are made of aluminum or aluminum alloy, or of copper or copper alloy.

7. The sealed battery according to claim 2, wherein the resistance welding is performed using resistance-welding electrode rods which have a diameter greater than the largest diameter of the through-hole or hollow viewed from above, and which are brought into contact in such a manner that the center thereof coincides with the center of the through-hole or hollow viewed from above.

* * * * *